Oct. 13, 1959 G. N. TAYLOR 2,908,766
INDIVIDUAL SOUND SYSTEM FOR PASSENGER VEHICLES
Filed Aug. 21, 1956 2 Sheets-Sheet 1
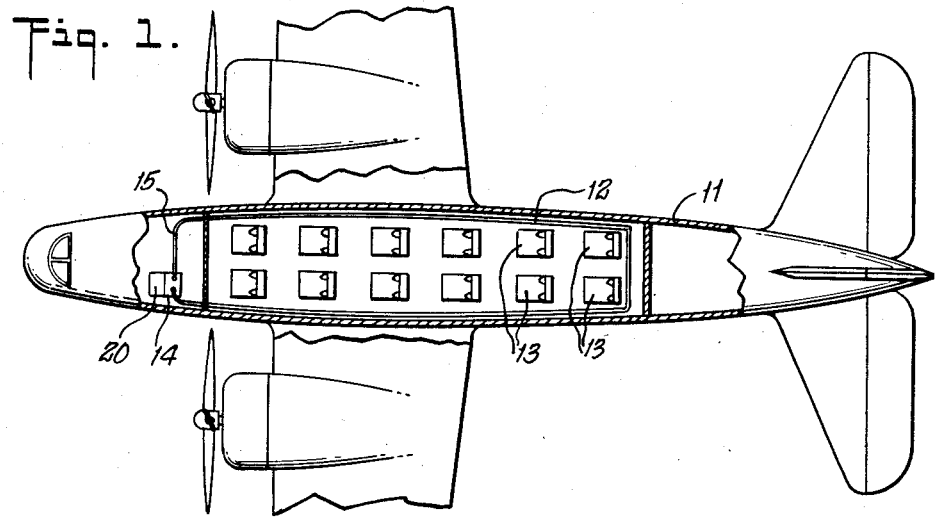
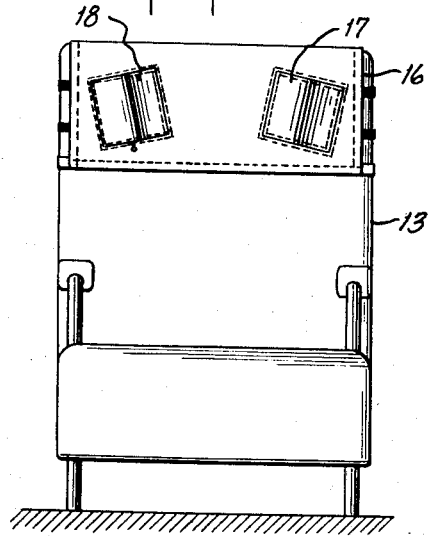
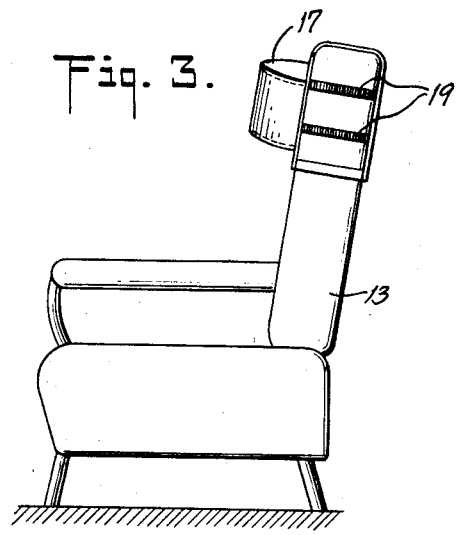
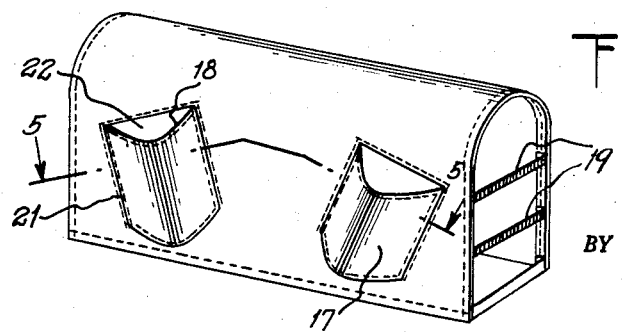
INVENTOR.
GORDON N. TAYLOR
BY
Darby+Darby
ATTORNEYS Oct. 13, 1959 G. N. TAYLOR 2,908,766
INDIVIDUAL SOUND SYSTEM FOR PASSENGER VEHICLES
Filed Aug. 21, 1956 2 Sheets-Sheet 2
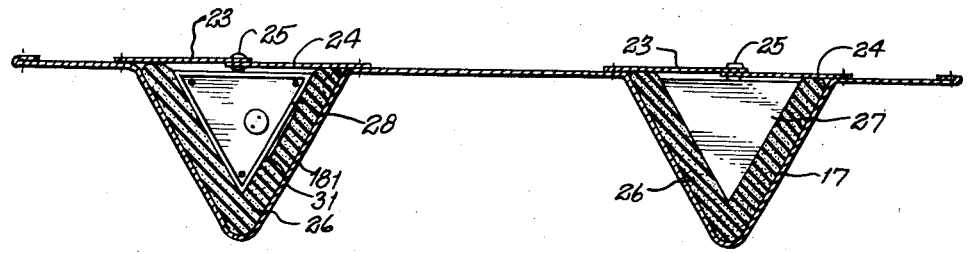
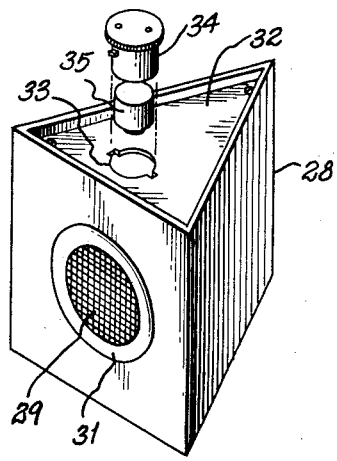
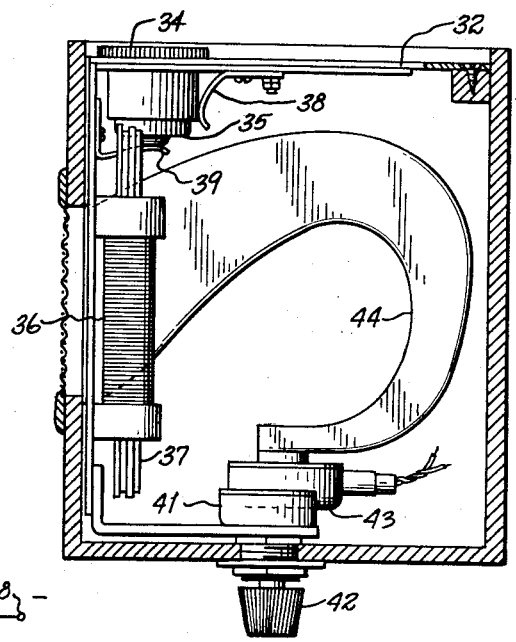
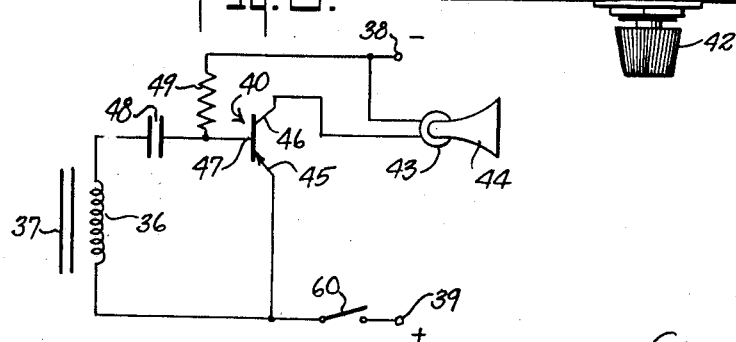
INVENTOR.
GORDON N. TAYLOR
BY
Darby + Darby
ATTORNEYS

2,908,766
INDIVIDUAL SOUND SYSTEM FOR PASSENGER VEHICLES

Gordon N. Taylor, Garden City, N.Y.

Application August 21, 1956, Serial No. 605,323

11 Claims. (Cl. 179—82)

The present invention relates to sound systems for passenger vehicles having individual receivers for the passengers and more particularly to such sound systems wherein the individual receivers are self-contained and do not require external electrical connections.

It is therefore an object of the present invention to provide a passenger vehicle sound system having individual receivers for the passengers.

Another object of the present invention is to provide a passenger vehicle sound system having individual receivers which do not require external electrical connections so that the system may be readily installed or removed.

A further object of the present invention is to provide a passenger vehicle sound system having individual receivers secured to the back of passenger seats which also serve as a headrest.

A still further object of the present invention is to provide an individual passenger vehicle sound system which is subject to individual control by the passenger and which allows the passenger to adjust the volume or turn off the music or speech on the individual system without interfering with the regular announcing system required for important or emergency instructions.

Other objects and advantages will be apparent from consideration of the following description in conjunction with the appended drawings in which Figure 1 is a fragmentary plan view of an airplane partially cut away to show the passenger compartment with a sound system according to the present invention.

Figure 2 is a front elevational view of a passenger seat with an individual receiver assembly attached thereto.

Figure 3 is a side elevational view of a passenger seat and receiver assembly shown in Figure 2.

Figure 4 is an enlarged perspective view of the receiver assembly.

Figure 5 is a horizontal sectional view of the receiver assembly taken along the line 5—5 in Figure 4.

Figure 6 is a perspective view of the receiver housing.

Figure 7 is a vertical cross sectional view of the receiver and receiver housing taken along the line 7—7 in Figure 5.

Figure 8 is a schematic circuit diagram of the transistor amplifier circuit of the receiver.

Referring now to the drawings and particularly to Figure 1, an airplane fuselage 11 is shown cut away to reveal a passenger compartment 12. The passenger compartment 12 is provided with a number of passenger seats 13. An audio-frequency amplifier 14 is connected to a loop of conductive material 15 which encircles the passenger compartment 12. An electrical signal from the amplifier 14 thus produces a current in the loop 15, and a fluctuating magnetic field in the passenger compartment 12, which corresponds to the signal produced by the amplifier 14.

The transmission loop 15 may consist of a single loop of wire or in some cases several loops of wire. It is of course desirable that the impedance of the loop match the amplifier output impedance. Wire of the proper resistance may be used to match the amplifier impedance or alternatively a matching transformer may be inserted between the amplifier 14 and the transmission loop 15.

Connected to the amplifier 14 is a sound signal source 20, furnishing a signal to be amplified by the amplifier 14. The signal source 20 may be a tape recorder, a conventional disk recorder, a radio receiver or any similar device to produce an audio signal which it is desired to transmit to the passengers of the airplane.

Although the device is described with reference to an airplane installation, clearly the sound system of the present invention could be installed in other vehicles such as buses, trains or the like. In addition to the tape recorder or other signal source shown at 20, a connection may be provided from the amplifier 14 to the pilot's microphone or to a microphone accessible to other crew members so that announcements may be made over the sound system in addition to the reproduction of music or the like from the signal source 20.

Figure 2 shows a passenger seat 13 having a cover 16 over a portion of the seat back. Attached to the cover are pockets 17 and 18. Pocket 18 contains an individual receiver which will later be described. As may be seen from Figures 2 and 3, the receiver is secured in close proximity to the passenger's ear so that the volume of sound produced by the receiver may be low and hence nearby passengers will not be disturbed by the sound emitted from the receiver.

Figure 4 shows the construction of the cover 16 in more detail, in particular, showing elastic or other resilient bands 19 attached to the ends of the cover and insuring that the cover fits snugly over the seat back. The pockets 18 are constructed of front pieces 21 of substantially rectangular shape, and top and bottom pieces 22 of approximately triangular shape so that a pocket 18 of triangular or wedge-shape is provided.

The cover 16 may be made of a suitable fabric on which are sewn the pockets 17 and 18, also made of fabric. The term fabric applied to the cover and pockets should be understood to include cloth, paper, plastic, and all similar fabric-like materials. It should also be understood that other means could be provided to attach a receiver to the passenger seat.

Figure 5 shows the inside of pockets 17 and 18. The pockets open to the inside of the cover 16 and flaps 23 and 24 are provided to close the pocket opening. A snap or other suitable fastener 25 retains the flaps in place, closing the opening to the pocket. The padding material 26 is placed inside the pocket so that the pocket forms a headrest. The padding 26 may be of sponge rubber, for instance, in order that a comfortable headrest is provided by the pocket 18.

Within the pocket 18, there is secured an inductive receiver 28, having an aperture 31 through which a sound signal is transmitted. Thus the receiver 28 forms a part of a headrest, consisting of pocket 18, padding 26 and the receiver 28. As previously mentioned, the receiver 28 is placed in proximity to the passenger's ear so that the volume of sound necessary is retained at a minimum and hence adjoining passengers are not disturbed.

The second pocket 17 is also provided with a padding 26, but rather than a receiver 28, is provided with a similar shaped block of wood or other material so that a matching headrest is provided on the other side of the seat 13.

Obviously the second pocket 17, which serves only as a headrest, is not necessary to the function of the sound system but may be desirable to improve the appearance of the installation and to increase the comfort of the passengers. The pocket 17 may be filled in any suitable manner in order to provide a headrest and is not limited to the particular construction shown in Figure 5.

The construction of the receiver unit is shown in Figures 6, 7 and 8. The receiver housing 28 is wedge-shaped and is provided with an aperture 31 covered by a screen 29 for the emission of the sound signal from the receiver. The top cover 32 is of triangular shape and is provided with an aperture 33 allowing access to the battery compartment of the receiver. The battery compartment 34 fits in the aperture 33. The battery compartment 34 accommodates a small long-life battery 35, which provides power for the receiver.

The receiver unit detects the magnetic fluctuations induced by the transmitting loop 15 by means of a coil 36 having a laminated core of magnetic material 37. It should be noted that the axis of the core 36 is substantially vertical as is the axis of the transmitting loop 15 so that the magnetic flux produced by the loop 15 is efficiently detected by the coil 36. The current induced in the coil 36 is amplified by a transistor circuit such as shown in Figure 8. The output of the transistor circuit (not shown in Figure 7) is fed to a small earphone 43. The earphone 43 may be of a type commonly used in hearing aids, for example. The sound produced by the hearing aid earphone 43 is guided by a horn 44 to the receiver aperture 31.

A curved exponential horn 44 is provided in the construction shown in Figure 7. It should be understood that any suitable means of providing the output of the hearing aid earphone 43 at the receiver aperture 31 would be satisfactory.

A combination volume control and on-off switch 41 is provided in the bottom of the receiver. A control knob 42 for switch 41 is located on the outside of the receiver housing 28. The volume control on-off switch provides a means whereby each passenger may control the receiver at his seat by adjusting the volume or turning off the receiver entirely. In some cases it may be unnecessary to provide a volume control and in this case a simple on-off switch could be substituted for the volume control on-off switch 41 as shown in the circuit diagram of Figure 8.

Figure 8 shows a transistor amplifying circuit for amplifying the electrical signal produced by the coil 36. For simplicity the electrical circuit is not shown in Figure 7. The negative terminal 38 is connected to the negative terminal of the battery. The positive terminal 39 is electrically connected to the positive terminal of the battery. An on-off switch 60 is connected to the positive terminal of the battery and provides a means for disconnecting the battery from the circuit thereby turning off the receiver. One terminal of the receiver coil 36 is connected through the switch 60 to the positive terminal 39. The other terminal of coil 36 is connected through the D.C. blocking capacitor 48 to the base 47 of a transistor 40. The emitter 45 of the transistor 40 is connected through the switch 60 to the positive terminal 39. The signal produced in the receiver coil is thus applied between the base and the emitter of the transistor 40.

The earphone 43 is connected between the collector 46 of the transistor 40 and the negative terminal 38. The resistor 49 is connected between the base 47 and the negative terminal 38. The resistor 49 thus completes a circuit from the collector through the earphone and the resistor to the base. Thus the audio-frequency signal in the receiver coil 36 is amplified by the transistor 40 and fed to the earphone 43. A horn 44 affixed to the earphone 43 conducts the audible signal to the aperture in the receiver housing in a manner previously explained.

The particular amplifying circuit shown in Figure 2 is only one of many various types of amplifying circuits which might be used to amplify the signal from the coil in order that sufficient power will be provided to produce an audible signal. Obviously a two-stage transistor amplifier could be used if necessary and in fact amplifiers other than transistor amplifiers could be used.

It is preferred, however, that a transistor amplifier be used in the receiver due to the fact that such an amplifier may be made very compact and the size of the receiver may be reduced. In addition, and perhaps more important, the power required by transistor amplifier is very small and hence only a small battery need be provided to power the amplifier. The battery will furnish many hours of service so that the batteries would last many months before becoming exhausted.

It should be noted that the provision for a self-contained power source such as a dry battery together with a wireless means of transmitting the signal to the receiver obviates the necessity of providing either signal wires or power wires to the receivers. This is a very important consideration in the installation of the system in an airplane, for instance, since the wireless system requires only the permanent installation of the single transmission loop 15 in the airplane. This may be readily installed without great difficulty, whereas individual wiring to each passenger position would require extensive modifications in the airplane. These modifications would be expensive in themselves and in addition, would require that the airplane be removed from service and hence incur a loss of revenue.

In addition to being easily installed, it may be seen that the system described may be readily removed and transferred to another vehicle. If this was desired, the amplifier and signal source, together with the individual receivers, could be readily removed in a matter of minutes leaving only the transmission loop installed in the airplane. A transmission loop is, of course, not an expensive item nor does it have any substantial weight, which would cause a disadvantage in leaving it installed in the airplane.

Although the receivers are adapted to be installed and removed quickly and conveniently, the preferred embodiment of the cover 16 for securing the receivers to the seats insures that the receivers themselves will not be pilfered or tampered with. The covers are so constructed that the receivers may not be removed without removing covers from the passenger seat and hence tampering with the receivers may be prevented with a minimum of supervision.

From the foregoing description it will be observed that a sound system is provided for passenger vehicle which may be installed without major modifications to the vehicle and which provides an individually controlled receiver at various positions in the vehicle.

Although a particular embodiment of the invention is shown and described, many modifications in the system might be made by a person skilled in the art without exceeding the scope of the present invention. The embodiment shown is therefore not to be construed in a limiting sense, but rather the scope of the invention is to be limited solely by the appended claims.

What is claimed is:

1. An individual sound reproducing system for passengers of a vehicle comprising an amplifier adapted to amplify an audio frequency signal from a signal source, a transmission loop connected to the output terminals of said amplifier, at least one individual inductive receiver assembly comprising means for attaching said assembly to a passenger seat, said attaching means comprising a fabric cover for a portion of the back of a passenger seat and a pocket attached to a cover and adapted to hold said receiver housing, a receiver housing, a receiver coil in said housing adapted to receive magnetic emanations from said transmission loop, a receiver amplifier circuit with its input connected to said receiver coil, and means for converting the electrical output of the receiver amplifier into an audible signal.

2. A system as claimed in claim 1 wherein said attaching means further includes a resilient material in said pocket so that said pocket also serves as a headrest.

3. A system as claimed in claim 1 wherein a second pocket is attached to said fabric material, said pocket containing a resilient material to provide a second headrest.

4. An individual inductive receiver assembly adapted to receive a signal from an inductive transmitter comprising means for attaching said assembly to a passenger seat, said attaching means including a fabric cover for a portion of the back of a passenger seat and a pocket attached to said cover and adapted to hold said receiver housing, a receiver coil in said housing adapted to receive electromagnetic emanations from a transmission coil, a receiver amplifier circuit with its input connected to said receiver coil, means connected to the output of said amplifier for converting the electrical output of the receiver into an audible signal and a battery for supplying electrical power to said amplifier.

5. A receiver assembly as claimed in claim 4 wherein said attaching means further includes a padding in said pocket so that said pocket also serves as a headrest.

6. A receiver assembly as claimed in claim 5 wherein said pockets open to the inside of said cover whereby access to the receiver housing may be obtained only by removing the cover from the back of the seat.

7. A receiver assembly as claimed in claim 8 wherein said amplifier circuit further includes a switch for disconnecting the battery and a volume control for adjusting the volume of the audible signal.

8. An individual inductive receiver assembly adapted to receive a signal from an inductive transmitter comprising a receiver housing, a receiver coil in said housing adapted to receive electro-magnetic emanations from a transmission loop, a receiver amplifier circuit with its input connected to said receiver coil, means connected to the output of said amplifier for converting the electrical output of the receiver into an audible signal, a battery for supplying electrical power to said amplifier, a cover adapted to fit over the upper portion of the back of a passenger seat, said cover having at least one section of resilient material to insure a snug fit on the passenger seats, a pocket secured to the front of said cover, padding secured as a lining in said pocket, said pocket being of a size and shape to contain snugly said receiver housing and padding.

9. A receiver assembly as claimed in claim 8 wherein said cover is provided with an opening giving access to the inside of said pocket.

10. A receiver assembly as claimed in claim 8 wherein said receiver housing is wedge-shaped.

11. A receiver assembly as claimed in claim 8 wherein said receiver includes a volume control and said pocket is provided with an opening through which said volume control extends.

References Cited in the file of this patent

UNITED STATES PATENTS

| | | |
|---|---|---|
| 1,712,158 | Neal | May 7, 1929 |
| 2,394,444 | Halstead | Feb. 5, 1946 |
| 2,512,641 | Halstead | June 27, 1950 |
| 2,567,431 | Halstead | Sept. 11, 1951 |

UNITED STATES PATENT OFFICE

CERTIFICATE OF CORRECTION

Patent No. 2,908,766                                           October 13, 1959

Gordon N. Taylor

It is hereby certified that error appears in the printed specification of the above numbered patent requiring correction and that the said Letters Patent should read as corrected below.

Column 4, line 65, for "a cover" read -- said cover --; line 66, for "said receiver" read -- a receiver --; column 5, line 24, for the claim reference numeral "8" read -- 4 --.

Signed and sealed this 26th day of April 1960.

(SEAL)
Attest:

KARL H. AXLINE
Attesting Officer

ROBERT C. WATSON
Commissioner of Patents